United States Patent
Chen et al.

(10) Patent No.: US 9,851,619 B2
(45) Date of Patent: Dec. 26, 2017

(54) LOW Z-HEIGHT CAMERA MODULE WITH ASPHERICAL SHAPE BLUE GLASS

(71) Applicant: Google Inc., Mountain View, CA (US)

(72) Inventors: Xi Chen, San Jose, CA (US); Lu Gao, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/518,148

(22) Filed: Oct. 20, 2014

(65) Prior Publication Data

US 2016/0109783 A1 Apr. 21, 2016

(51) Int. Cl.
| | | |
|---|---|---|
| G03B 11/00 | (2006.01) | |
| G02B 5/20 | (2006.01) | |
| H04N 5/225 | (2006.01) | |
| G02B 7/02 | (2006.01) | |

(52) U.S. Cl.
CPC .......... *G03B 11/00* (2013.01); *G02B 5/208* (2013.01); *G02B 7/025* (2013.01); *H04N 5/2253* (2013.01); *H04N 5/2254* (2013.01); *H04N 5/2257* (2013.01)

(58) Field of Classification Search
CPC .... G03B 11/00; H04N 5/2252; H04N 5/2253; H04N 5/2254; G02B 7/025; G02B 5/208
USPC ............................ 348/335, 374, 340; 438/65
See application file for complete search history.

(56) References Cited

U.S. PATENT DOCUMENTS

| | | |
|---|---|---|
| 5,400,182 A | 3/1995 | Chiba |
| 8,599,301 B2 | 12/2013 | Dowski et al. |
| 2004/0012698 A1 | 1/2004 | Suda et al. |
| 2004/0165098 A1* | 8/2004 | Ikeda .................. H04N 5/2253 348/340 |
| 2011/0102904 A1 | 5/2011 | Li |
| 2011/0115965 A1 | 5/2011 | Engelhardt et al. |
| 2013/0270419 A1* | 10/2013 | Singh ................ H01L 27/14618 438/65 |
| 2015/0062407 A1* | 3/2015 | Chen ........................ G02B 9/62 348/335 |
| 2015/0241665 A1* | 8/2015 | Hashimoto ........ G02B 13/0045 359/713 |
| 2015/0293970 A1 | 10/2015 | Li et al. |

FOREIGN PATENT DOCUMENTS

| | | | |
|---|---|---|---|
| EP | 1239519 A2 | 9/2002 | |
| KR | 10-2010-0126990 | * 12/2010 | ............. H04N 5/232 |

* cited by examiner

*Primary Examiner* — Nhan T Tran
(74) *Attorney, Agent, or Firm* — Fish & Richardson P.C.

(57) ABSTRACT

A blue glass infrared cutoff filter is disclosed that contains an aspheric epoxy replicated on a first surface of the infrared cutoff filter. The aspheric epoxy and blue glass infrared cutoff filter may be a component of a camera device that includes a lens barrel with one or more lenses disposed therein. The camera device may include a sensor for detecting light received by the camera device. The sensor may be connected to circuitry that dispatches the detection data generated by the sensor to a processor of a device into which the camera device has been incorporated.

19 Claims, 10 Drawing Sheets

RELATED ART

LOW Z-HEIGHT CAMERA MODULE WITH ASPHERICAL SHAPE BLUE GLASS

BACKGROUND

Camera portability is important to many devices including mobile devices such as a smartphone or a tablet. Camera sensor size, lens optics, and light filters are directly related to the quality of the image the camera is capable of capturing. Miniaturization of devices containing cameras often necessitates utilizing smaller cameras. In reducing the size of camera's components, the quality of the image captured by the camera may be degraded. For example, for a short z-height compact camera module with a relatively large field of view may have difficulty capturing a sharp image. This may be particularly noticeable at the periphery of the field of view relative to the center of the field. Additional lenses can be added to the lens assembly of the camera module to improve the modulation transfer function ("MTF"); however, the additional lenses may increase the z-height of the camera module thereby making it more obtrusive for portable devices.

Wafer level lenses utilize replication technology for all lens elements. The lens elements are replicated on each wafer glass. The replicated lens elements can be stacked on top of one another to form an entire lens assembly. However, these lenses typically have poorer sharpness due to limitations on the materials that can be used to generate the lenses and/or the assembly process.

BRIEF SUMMARY

According to an implementation, a camera device is disclosed that includes a lens barrel with one or more lenses disposed therein. The device may include a blue glass infrared cutoff filter. An aspheric epoxy surface may be disposed (e.g., replicated) on a first surface of the blue glass infrared cutoff filter. The device may include a sensor disposed to receive light transmitted through the lenses disposed inside the lens barrel and the blue glass infrared cutoff filter. The device may include a circuit configured to receive detection data from the sensor and sent it to a processor.

In an implementation, an epoxy may be disposed on a first surface of a blue glass infrared cutoff filter. The infrared cutoff filter may be aligned to a sensor. The sensor may be attached to a circuit board. A lens holder may be aligned to the sensor and any lenses in the lens barrel may be focused.

A system is disclosed that includes an aspheric epoxy surface disposed on a blue glass infrared cutoff filter. The blue glass infrared cutoff filter may be disposed between a sensor and at least one lens.

In an implementation, a system according to the presently disclosed subject matter may include a means for disposing (e.g., replicating) an aspheric epoxy on a blue glass infrared cutoff filter. The system may include a means for receiving light by a sensor. The system may include a lens means for focusing light received by the system. The aspheric epoxy and blue glass infrared cutoff filter may be disposed between the sensor and the lens means.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
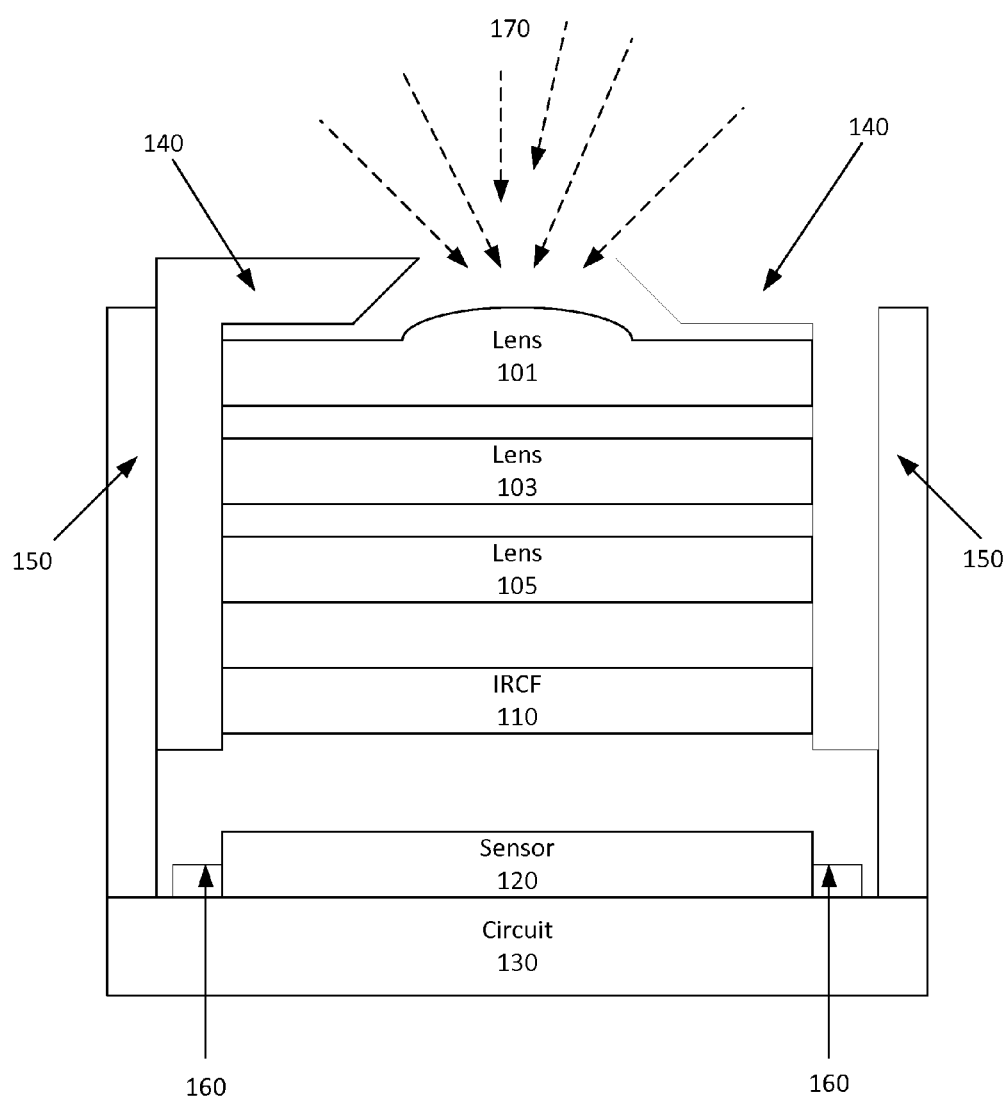
FIG. 1 shows a cross-sectional view of an example of a conventional camera module assembly.
Figure 2:
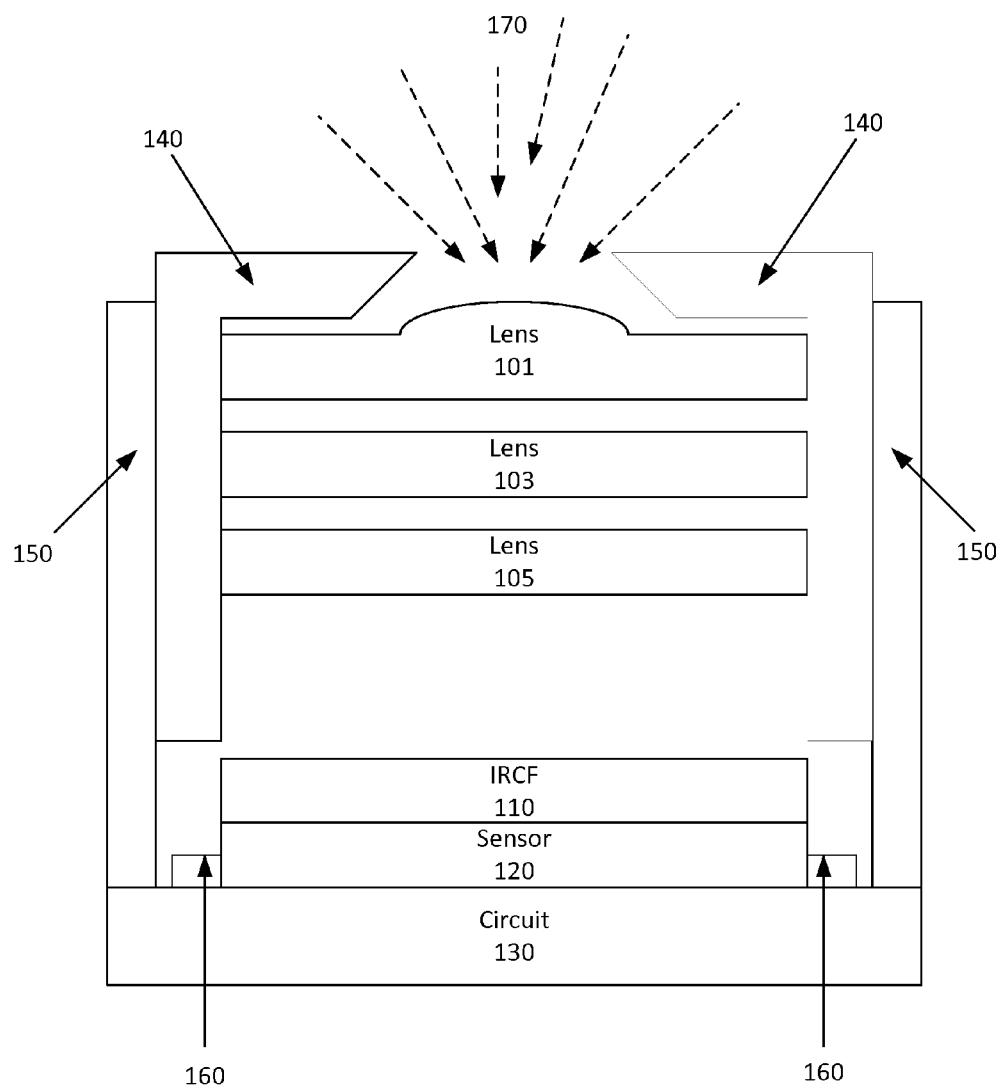
FIG. 2 shows a cross-sectional view of an example of a camera module in which the IRCF is mounted outside of the lens barrel as disclosed herein.

A lens structure is disclosed that can improve the resolution of the periphery of the field of view of a camera device. FIG. 1 shows a cross-sectional view of an example of a conventional camera module assembly. Assembly of the camera module can be carried out in two stages. In one stage, the lens barrel 140 may be assembled. The lens barrel 140 typically contains one or more lenses 101, 103, 105 that can be planar, convex, concave, and/or aspheric in shape. Generally, a higher resolution camera device will require more lenses. The thickness of the lenses 101, 103, 105 may not be uniform and they may be tightly packed together utilizing an epoxy coating, for example, or separated by a measurable space inside the lens barrel 140. The lens barrel 140 may have an aperture near the top side which allows light 170 to enter the lens barrel 140. In some configurations, an infrared cutoff filter ("IRCF") 110 can be mounted inside the lens barrel 140 as shown in FIG. 1. The lens barrel 140 may contain markings that can be utilized to focus and/or align the lenses 101, 103, 105 disposed therein. In some configurations, the IRCF 110 can be mounted outside of the lens barrel 140 and proximal to or in contact with the sensor 120 as shown in FIG. 2. The lens barrel 140 may be constructed by a lens vendor.

In a second or separate stage, a camera module integrator, for example, may insert the lens barrel 140 into the lens holder 150. The lens barrel 140 may be screwed into the holder 150 or otherwise secured to the holder 150. The lens holder 150, for example, may be adhered to a printed circuit board ("PCB"), flex board or other circuitry 130 or otherwise secured to the PCB 130. A sensor or sensor array 120 may receive the light 170 that has been passed through the lenses 101, 103, 105 of the lens barrel 140 and filtered by the IRCF 110. The sensor 120 may generate detection data corresponding to the light the sensor 120 has detected or received. The sensor 120 may be connected to the PCB 130 using a variety of conventional techniques. The PCB 130 may receive the detection data generated by the sensor 120. The sensor 120 may be wired 160 onto the PCB 130, for example. The entire camera module can be mounted to the chassis of another device such as a mobile phone, tablet computing device, or the like. The PCB 130 may utilize a ball grid array, for example, to connect to circuitry of the other device (e.g., smartphone). For example, the camera module may be mounted to a smartphone containing a storage medium, a display, and a processor. The processor may receive the detection data and output the detection data onto the smartphone's display.

Figure 3:
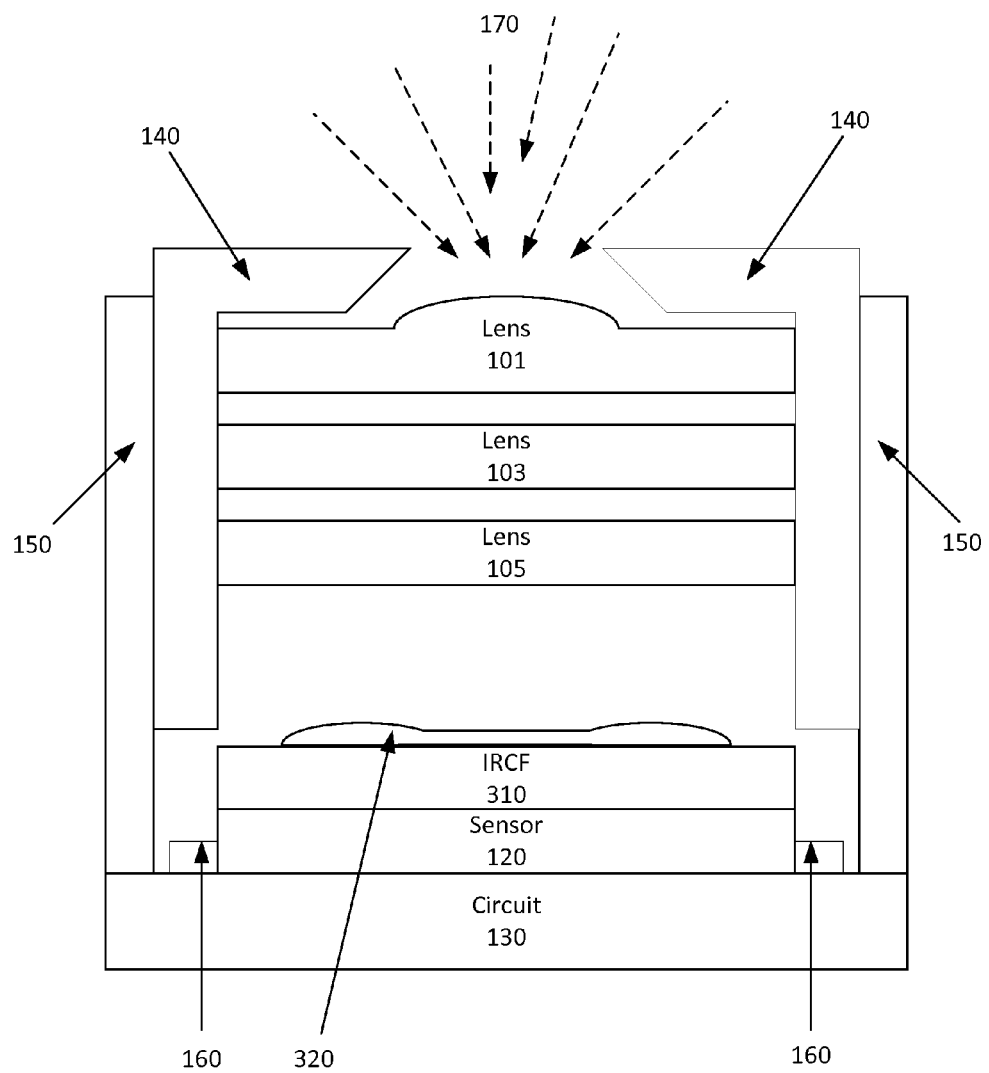
FIG. 3 shows a cross-sectional view of an example of a camera module in which an aspheric epoxy surface has been mounted on the IRCF as disclosed herein.

Usually the IRCF is a planar surface and it can be utilized to absorb virtually any range of wavelength of light. Typically blue glass absorbs a wavelength of light in a range near the infrared light spectrum. As disclosed herein and shown in FIG. 3, an aspheric epoxy surface 320 may be disposed or replicated on a first surface of the blue glass IRCF 310. The first surface may correspond to the side of the IRCF 310 that is facing the lens barrel 140 and lenses 101, 103, 105 therein. A second surface of the IRCF 310 may face the sensor 120. As stated earlier, the ICRF 310 may be adjacent to the sensor 120. In some configurations it may be in physical contact with the sensor 120 as shown in FIG. 3 or it may be physically separate from the sensor 120.

The aspheric epoxy surface 320 may be replicated from, for example, a diamond turned mold and ultraviolet cured. The mold for the aspheric surface 320 may be aligned with the blue glass with high accuracy utilizing, for example, alignment markings on the blue glass IRCF 310. The mold may be formed out of any solid material such as glass or plastic. The epoxy may be a liquid at standard temperature and pressure and may naturally adhere to the surface of the blue glass infrared filter cutoff. The epoxy may be cured by UV treatment, after which it may be solid.

The aspheric epoxy surface 320 may be utilized to correct the curvature of the field of view of the lenses in the lens barrel and may be particularly useful for large image heights (e.g., when the subject to be captured is particularly tall). As shown in FIG. 3, the epoxy surface appears as two convex portions with a valley between them due to FIG. 3 being a cross sectional view of the camera device. The height of the convex portions in FIG. 3 may be dependent on the degree of curvature that is to be corrected. An advantage of the aspheric epoxy surface may be that it has a less stringent decenter tolerance as compared to the lenses in the lens barrel due to the distance between the IRCF and the lens nearest the aperture, and because the aspheric surface is designed to improve the periphery of the field of view instead of the center of the image.

The blue glass IRCF 310 with aspheric surface 320 may be attached to the sensor array, for example, using an adhesive such as glue. As stated earlier, it is not necessary for the blue glass IRCF 310 to be in physical contact with the sensor 120. As is conventionally performed, the lens barrel may be aligned with the sensor array utilizing a high precision automatic lens holder attachment machine. For implementations disclosed herein, the lens barrel may be aligned to the sensor with a tolerance of less than 10 µm. Implementations disclosed herein may operate more efficiently when the lens holder attachment alignment tolerance is controlled to be within 5-10 µm. The decenter tolerance for the aspheric epoxy surface, however, may be less than other lens elements.

Figure 4:
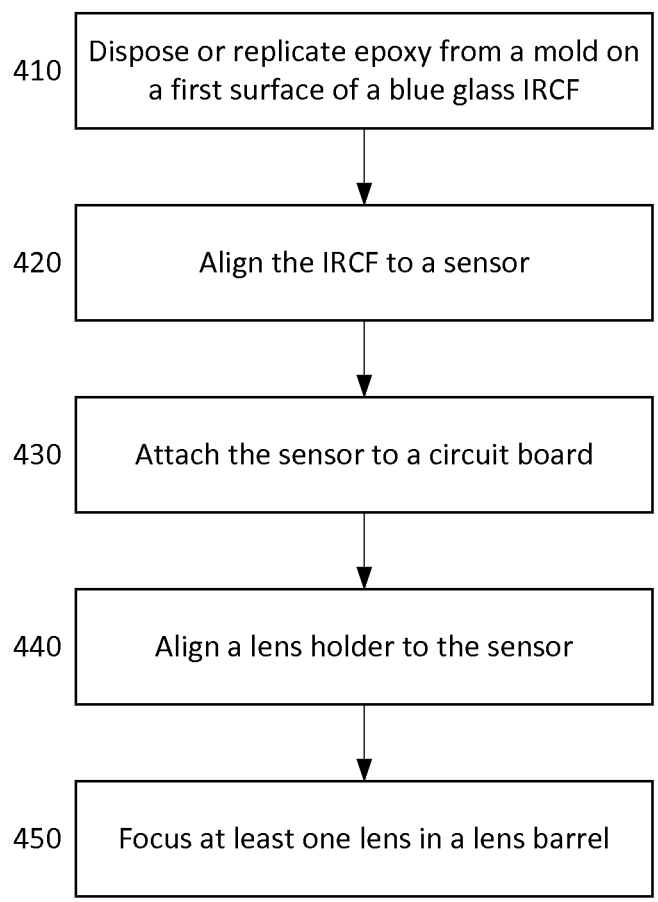
FIG. 4 is an example process for generating a camera device with an aspheric epoxy surface on the IRCF as disclosed herein.

In an implementation, a process for generating a camera device is provided as shown in the example in FIG. 4. An epoxy may be replicated onto a first surface of a blue glass IRCF using an aspheric mold that may be aligned onto the blue glass IRCF at 410. The IRCF may be aligned to a sensor at 420. The alignment of the IRCF may be performed using markings on the sensor. The alignment may be less precise if the size of the sensor is large relative to the size of the blue glass IRCF. Further, because the blue glass IRCF is designed to improve the sharpness of the periphery of an image, it may not require as strict of an alignment as the lens elements, for example. In configurations in which a second surface of the blue glass IRCF is in contact with the sensor, it may be adhered to the sensor using a glue. The second surface may be on the opposite side of the IRCF as compared to the first surface. The sensor may be attached to a circuit board using at 430. The sensor may generate detection data based on the light received through the IRCF. A lens holder may be aligned to the sensor at 440. The lens holder may be glued or screwed to the sensor and/or circuit, for example. A lens barrel, as described earlier, may be secured the lens holder, for example, by screwing the lens barrel into the lens holder. The lenses in the lens barrel may be focused at 450. For example, a series of images may be captured by the camera device corresponding to an adjustment of one or more of the lens in the lens barrel. The lens barrel contains marking to assist in the alignment and focusing of the lenses therein. For each picture, the image may be evaluated to determine which of the series of test images captured by the camera device provided the sharpest or highest quality image and the lenses may be adjusted to the setting for the image determined to be of the highest quality. Other techniques for focusing lenses are known in the art and may be utilized with the implementations disclosed herein. The order of the processes disclosed in FIG. 4 may be varied from that shown in FIG. 4.

Figure 5:
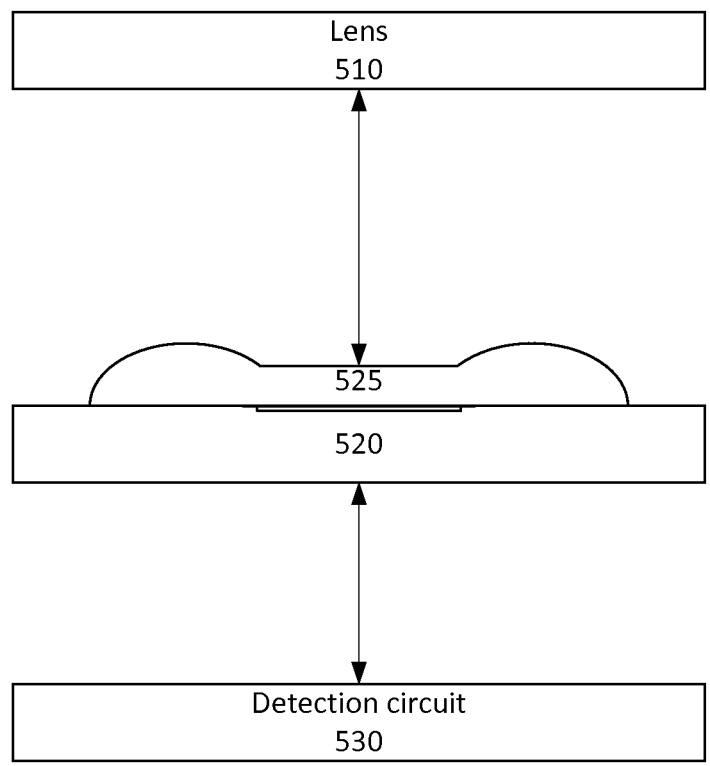
FIG. 5 shows an example of a light filtering system as disclosed herein.

In an implementation, an example of which is provided in FIG. 5, a light filtering system is disclosed that includes a blue glass IRCF 520 on to which an aspheric epoxy surface 525 has been replicated. The aspheric epoxy surface 525 and blue glass IRCF 520 may be disposed between one or more lenses 510 and a detection circuit 530. The detection circuit 530 may include a sensor for receiving the light passed through the lens 510, the aspheric epoxy surface 525, and the blue glass IRCF 520. The detection circuit 530 may communicate the data generated by the sensor to a processor connected to the filter system. For example, the filter system may be a component of a portable camera. The camera may have a processor that can process the image captured by detection circuit 530.

Figure 6:
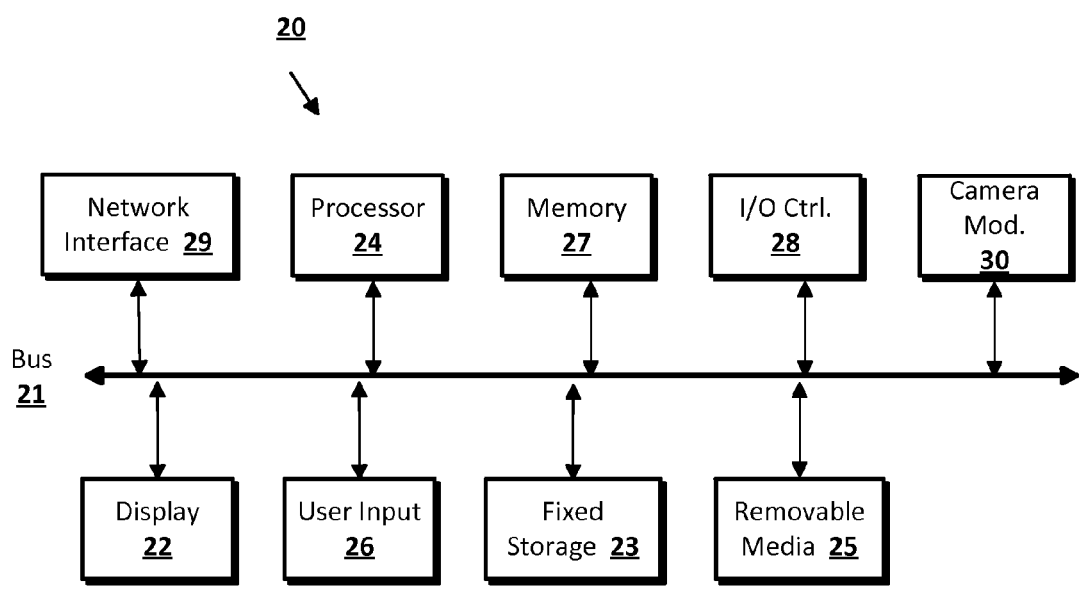
FIG. 6 shows a computer according to an implementation of the disclosed subject matter.

Implementations of the presently disclosed subject matter may be implemented in and used with a variety of component and network architectures. FIG. 6 is an example computer 20 suitable for implementations of the presently disclosed subject matter such as a smartphone or tablet. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The circuitry of the camera module 30, such as that shown in FIG. 3, may be connected to the Bus 21 to provide communication between the processor 24 and the other components of the computer 20.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 7:
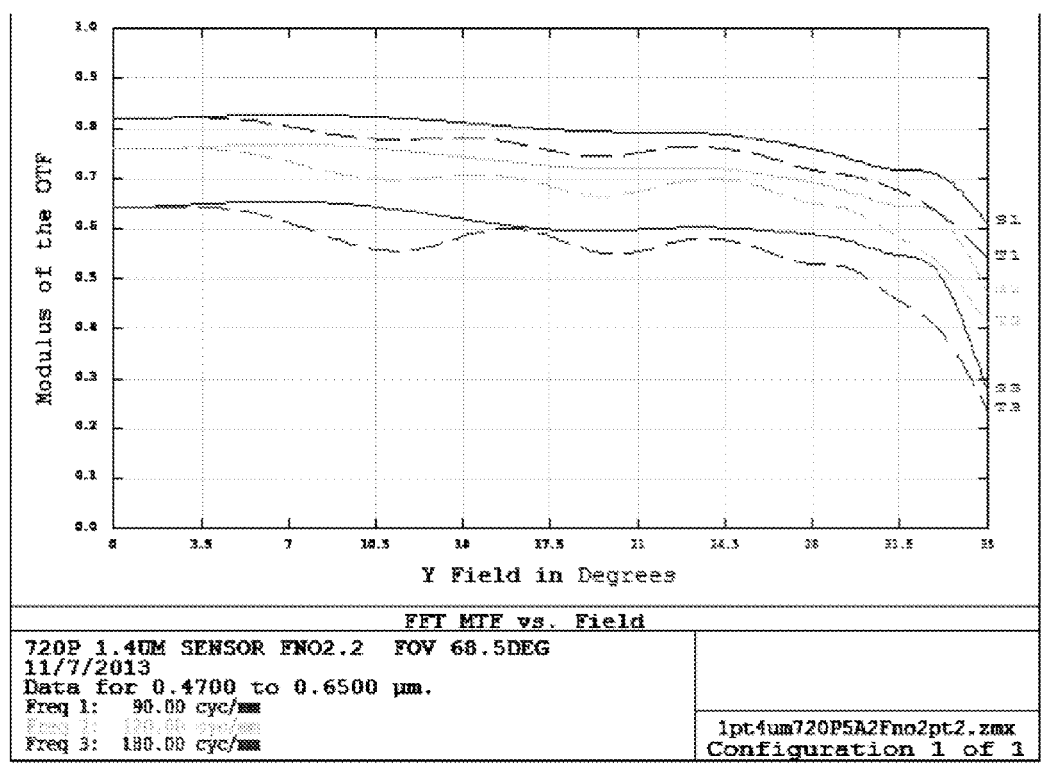
FIG. 7 shows a graphical representation of MTF vs. Field Height of a conventional camera module.
Figure 8:
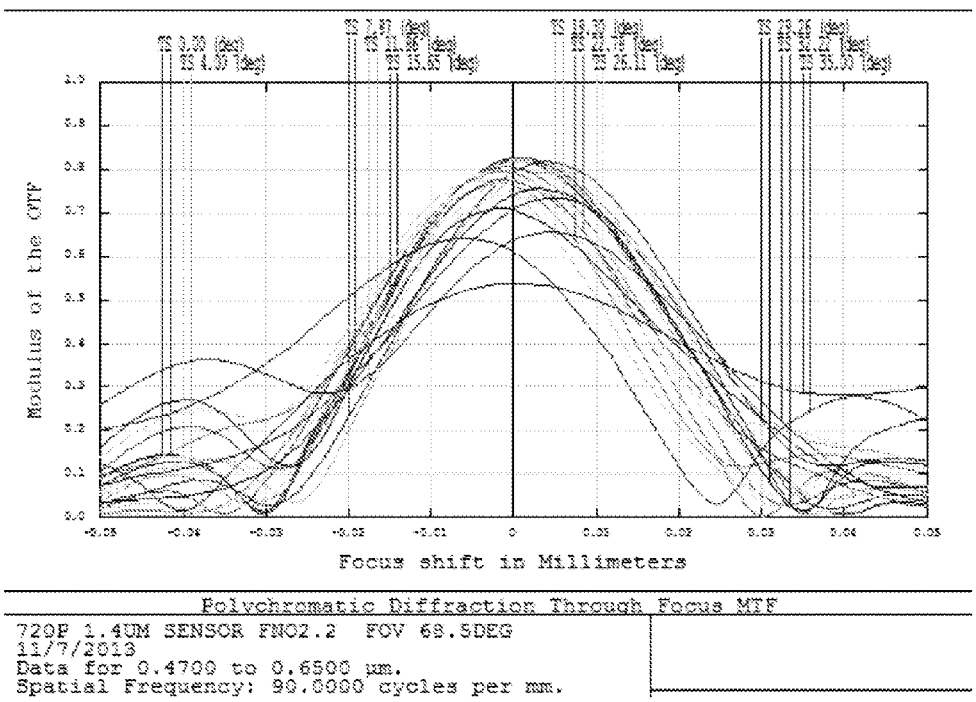
FIG. 8 shows a graphical representation of MTF vs. Focus shift of a conventional camera module.

FIG. 7 shows a graphical representation of MTF vs. Field Height of a conventional camera module (e.g., device). The conventional camera module example in FIG. 7 has a pixel resolution of 1280×720p from a 1.4 µm sensor with a 3P lens. As indicated by the graph, the field of view increases (e.g., the image height), the MTF drops off quickly. FIG. 8 shows a graphical representation of MTF vs. Focus shift of a conventional camera module that has the same specifications as that shown in FIG. 7. The through-focus MTF at 90 lps/mm shown in FIG. 8 shows that there is approximately 8 µm of field curvature at the edge of the field of view which may cause the MTF degradation at large image heights (see FIG. 7).

Figure 9:
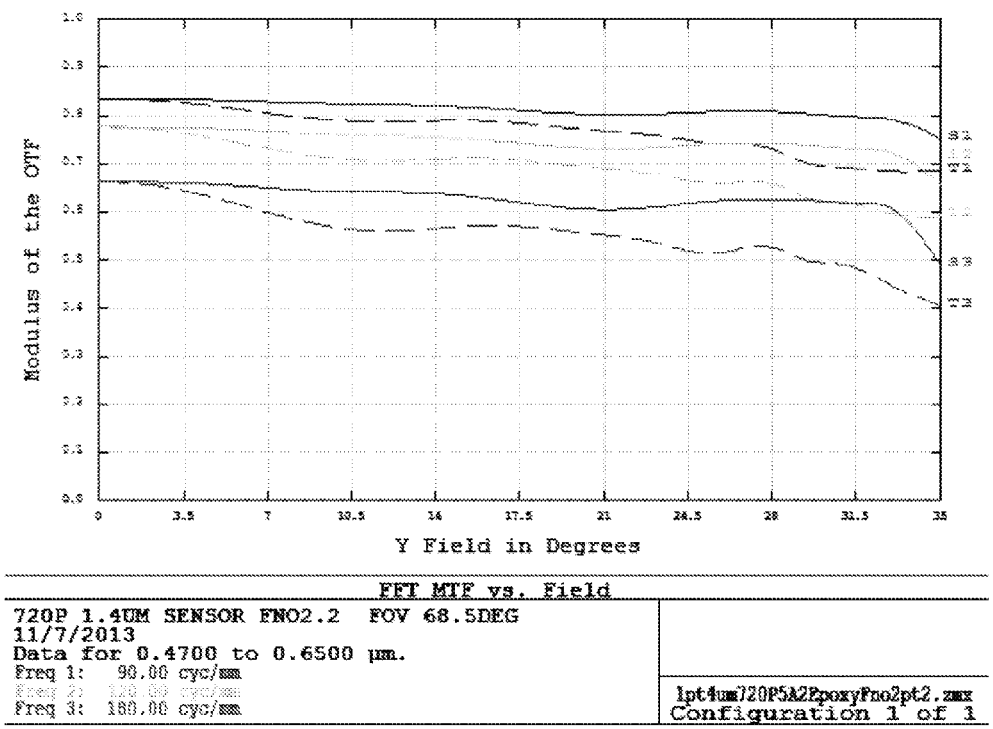
FIG. 9 shows a graphical representation of MTF vs. Field Height of a camera device as disclosed herein.
Figure 10:
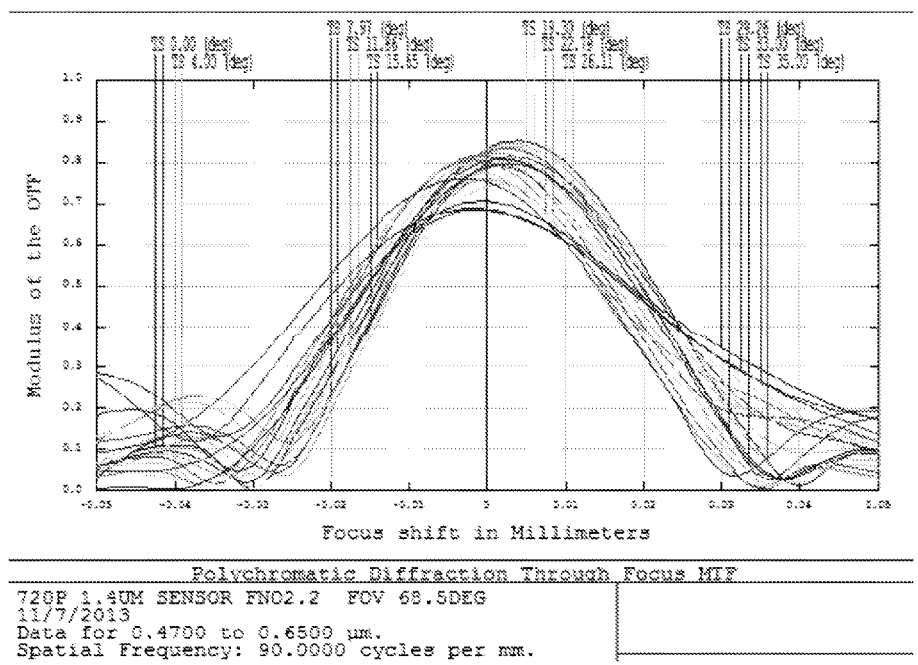
FIG. 10 shows a graphical representation of MTF vs. Focus shift of a camera device as disclosed herein.

FIGS. 9 and 10 have a 3P lens with the aspheric epoxy surface as disclosed herein. The other specifications of the camera device match those of the camera utilized to generate the data in FIGS. 7 and 8. FIG. 9 shows a graphical representation of MTF vs. Field Height of a camera device as disclosed herein. In contrast to FIG. 7, the MTF is relatively uniform throughout the entire field of view. FIG. 10 shows a graphical representation of MTF vs. Focus shift of a camera device as disclosed herein. In comparison to FIG. 8, the through focus MTF shows that there is 5 µm of field curvature through the entire field of view. The off-axis MTF degradation compared with on-axis image height appears to be significantly less than that shown in FIG. 8 with similar first order parameters. Thus, the camera device disclosed herein with aspheric epoxy deposited on the blue glass IRCF may provide more uniform sharpness over the entire sensor array image heights. This epoxy aspheric surface may act as a field corrector to correct field curvature.

The illustrative examples provided in FIGS. 7-10 compare MTF resolution uniformity over the entire sensor array. The lens z-height, Fno, FoV (i.e., field of view) and other major first-order optical parameters such as optical distortion, lateral color, relative illumination, effective focal length (EFL) are maintained almost the same as a conventional 3P lens design for a 1280 by 720P 1.4 µm sensor array. The 3P lens design parameters utilized for the testing and illustrative examples in FIGS. 7-10 includes: FoV set at 68.5°, EFL: 1.536 mm, Fno: 2.2, MTTL: 1.8 mm, CRA<30°, Relative Illumination: 0.38, and Optical Distortion: <2%.

The comparison indicates that camera device disclosed herein may have less MTF degradation at the edge of the FoV.

Disposing the aspheric epoxy surface on the blue glass may reduce the z stack height of the camera module because an additional lens is not required to correct field curvature. This may be particularly advantageous in mobile device or portable camera devices in which there exists a constant pressure to reduce the size of the camera module. Similarly, wafer level lenses may use replication technology for all lens elements (e.g., lens elements are replicated on each wafer glass). Several wafer glass pieces with replicated lenses may be stacked together to form the entire lens assembly. However, these lenses may suffer from poor sharpness performance due to material limitations and assembly tolerance. The replication technology disclosed herein may be applied to the last surface of the lens and the tolerance requirement may be less strict than those required for wafer-level lenses. As stated above, the disclosed replication technique may provide better sharpness than conventional wafer-level lenses.

Implementations disclosed herein are described in illustrative examples with respect to an aspheric surface in association with a blue glass IRCF in a camera device. However, an aspheric epoxy surface may be deposited on a lens that is not related to a blue glass IRCF. For example, one of the lenses in the lens barrel may be a flat lens shape. A flat lens shape may refer to the surfaces (e.g., a top side and bottom side) of the lens through which light passes for imaging. The aspheric epoxy may be deposited or replicated on the surface of the lens to create an aspheric lens. Lenses may have a shape that is convex, concave, flat, biconvex, or biconcave. Use of the aspheric epoxy may have benefits in other areas of optics. For example, a convex aspheric lens may be useful in resolving near field vision and a concave aspheric lens may be useful in far field resolution. Various embodiments disclosed herein may be used to fabricate surfaces other than the particular aspheric surfaces provided as illustrative embodiments, and other structures also may be created using the techniques disclosed herein without departing from the scope of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A camera device, comprising:
   a lens barrel;
   at least one lens disposed inside the lens barrel;
   a blue glass infrared cutoff filter;
   an aspheric epoxy surface disposed on a first surface of the blue glass infrared cutoff filter, wherein the aspheric epoxy surface has two convex portions with a valley between the two convex portions on only a front surface of the aspheric epoxy surface; and
   a sensor disposed to receive light transmitted through the at least one lens disposed inside the lens barrel and the blue glass infrared cutoff filter, the sensor disposed in direct physical contact with a second surface of the blue glass infrared cutoff filter, the second surface opposite of the first surface,
   wherein the device is configured to produce a modulation transfer function with a value greater than 0.4 for a field of view less than 35 degrees.

2. The device of claim 1, further comprising a circuit configured to receive detection data from the sensor and send it to a processor.

3. The device of claim 1, wherein the blue glass infrared cutoff filter is glued to the sensor.

4. The device of claim 1, wherein the blue glass infrared cutoff filter is disposed inside the lens barrel.

5. The device of claim 1, wherein a mold for the aspheric epoxy surface is aligned to the blue glass infrared cutoff filter prior to disposing the aspheric epoxy surface on the first surface of the blue glass infrared cutoff filter.

6. The device of claim 1, wherein the lens barrel is aligned to the sensor.

7. The device of claim 1, wherein the lens barrel is aligned to the sensor within a tolerance of not more than 10 µm.

8. The device of claim 1, wherein the blue glass infrared cutoff filter is disposed outside of the lens barrel.

9. The device of claim 1, wherein the device is configured to produce a field curvature with a value of about five microns through an entire field of view.

10. The device of claim 1, wherein the aspheric epoxy surface is shaped to improve a periphery of a field of view instead of a center of an image.

11. A method of fabricating a camera device, comprising:
   replicating epoxy from an aspheric mold on a first surface of a blue glass infrared cutoff filter, wherein a shape of the aspheric mold replicates the epoxy to have two convex portions with a valley between the two convex portions on only a front surface of the epoxy;
   disposing a second surface of the blue glass infrared cutoff filter to have a direct physical contact with a sensor, the second surface opposite of the first surface;
   attaching the sensor to a circuit board;
   aligning a lens holder to the sensor; and
   focusing at least one lens in a lens barrel,
   wherein the camera device is configured to produce a modulation transfer function with a value greater than 0.4 for a field of view less than 35 degrees.

12. The method of claim 11, further comprising affixing the blue glass infrared cutoff filter to the sensor.

13. The method of claim 11, further comprising disposing the blue glass infrared cutoff filter inside the lens barrel.

14. The method of claim 11, further comprising aligning the aspheric mold to the blue glass infrared cutoff filter.

15. The method of claim 11, further comprising aligning the lens barrel to the sensor.

16. The method of claim 15, wherein the aligning is within a tolerance of not more than 10 µm.

17. The method of claim 11, further comprising disposing the blue glass infrared cutoff filter outside of the lens barrel.

18. The method of claim 11, wherein the camera device is configured to produce a field curvature with a value of about five microns through an entire field of view.

19. The method of claim 11, wherein the aspheric epoxy surface is shaped to improve a periphery of a field of view instead of a center of an image.

* * * * *